United States Patent
Sagefalk et al.

(10) Patent No.: US 7,256,834 B1
(45) Date of Patent: Aug. 14, 2007

(54) DIGITAL CAMERA HAVING PANNING AND/OR TILTING FUNCTIONALITY, AND AN IMAGE ROTATING DEVICE FOR SUCH A CAMERA

(75) Inventors: Willy Sagefalk, Lund (SE); Lars Abrahamsson, Linkoping (SE)

(73) Assignee: Axis, AB, Lund (SE)

( * ) Notice: Subject to any disclaimer, the term of this patent is extended or adjusted under 35 U.S.C. 154(b) by 0 days.

(21) Appl. No.: 09/700,530

(22) PCT Filed: Mar. 17, 2000

(86) PCT No.: PCT/SE00/00522

§ 371 (c)(1),
(2), (4) Date: Feb. 9, 2001

(87) PCT Pub. No.: WO00/57246

PCT Pub. Date: Sep. 28, 2000

(51) Int. Cl.
*H04N 5/225* (2006.01)
*H04N 7/00* (2006.01)

(52) U.S. Cl. ............... 348/373; 348/335; 348/36

(58) Field of Classification Search ........... 348/335, 348/36, 37, 38, 39, 373, 374, 205; 359/196, 359/201, 202, 223, 224, 225, 226
See application file for complete search history.

(56) References Cited

U.S. PATENT DOCUMENTS

| | | | |
|---|---|---|---|
| 3,868,706 A * | 2/1975 | Steingold | 396/21 |
| 3,959,582 A * | 5/1976 | Law et al. | 348/37 |
| 4,153,917 A * | 5/1979 | Catano et al. | 386/82 |
| 4,322,740 A | 3/1982 | Takemoto et al. | 348/264 |
| 4,499,490 A * | 2/1985 | Morgan | 348/37 |
| 4,576,432 A * | 3/1986 | Ruger | 374/124 |
| 4,678,289 A * | 7/1987 | Mattelin et al. | 359/226 |
| 4,933,822 A | 6/1990 | NakaMats | 362/282 |
| 5,543,954 A * | 8/1996 | Nicholson | 359/201 |
| 5,606,368 A | 2/1997 | Corradini | |
| 5,717,512 A * | 2/1998 | Chmielewski et al. | 359/210 |
| 5,790,182 A | 8/1998 | St. Hilaire | 348/36 |
| 5,805,325 A * | 9/1998 | Clune | 359/226 |
| 5,907,433 A * | 5/1999 | Voigt et al. | 359/432 |
| 5,933,186 A | 8/1999 | Ikari et al. | 348/97 |
| 6,057,915 A * | 5/2000 | Squire et al. | 356/139.05 |
| 6,118,474 A | 9/2000 | Nayar | 348/36 |
| 6,654,063 B1 * | 11/2003 | Tadatsu | 348/373 |
| 6,831,693 B1 * | 12/2004 | Sunaga | 348/335 |
| 6,963,375 B1 * | 11/2005 | Lundberg | 348/335 |

FOREIGN PATENT DOCUMENTS

| | | |
|---|---|---|
| DE | 9106075.3 | 5/1991 |
| EP | 0452188 A1 | 10/1991 |

* cited by examiner

*Primary Examiner*—Lin Ye
(74) *Attorney, Agent, or Firm*—IP Creators; Charles C Cary

(57) ABSTRACT

A digital camera (300) has panning and/or tilting functionality and comprises: a camera housing (6) with an optical input (400), such as a lens or objective (8); an image capturing unit (500) for producing a digital image from light received through the optical input; and a controller (600). A first mirror (9) is mounted externally to the camera housing (6). An image rotating device (200) receives an angular displacement control signal from the controller (600) and rotates the first mirror at an angle with respect to the optical input (400, 8) of the camera housing (6).

1 Claim, 4 Drawing Sheets

DIGITAL CAMERA HAVING PANNING AND/OR TILTING FUNCTIONALITY, AND AN IMAGE ROTATING DEVICE FOR SUCH A CAMERA

TECHNICAL FIELD

The present invention relates to a digital camera having panning and/or tilting functionality, and more specifically to a digital camera having a camera housing with an optical input, such as a lens or objective, an image capturing unit and a controller. The invention also relates to an image rotating device for providing the panning and/or tilting functionality of such a digital camera.

BACKGROUND ART

A common example of a digital camera with panning and/or tilting functionality is a web camera, which e.g. may be mounted at a given location for the purpose of surveillance, production monitoring, etc. The web camera comprises an optical input in the form of a lens or objective and an image capturing unit for producing a digital image from light received from the optical input. Usually, the image capturing unit comprises a CCD element (Charge Coupled Device). The web camera has software and hardware for allowing the camera to be connected to a given network, such as an Ethernet or Token Ring network. The web camera is arranged to produce digital images at a given rate, such as 1-25 images per second. In order to increase the visual volume covered by the web camera, the camera is provided with mechanical means for panning and/or tilting the camera. Generally speaking, "panning" means rotating the camera by a given angle (normally 0°-360°) in a horizontal plane, and "tilting" means rotating the camera by a given angle (normally 0°-180°) in a vertical plane.

In prior art web cameras the panning and/or tilting functionality is obtained by moving the whole camera or at least the objective thereof. Since the camera and objective have a considerable weight, such an approach involves complex, large and expensive mechanics. Furthermore, the speed at which the camera may be panned or tilted is restricted due to the large mass, that has to be moved accordingly.

SUMMARY

It is an object of the present invention to provide a digital camera, which allows faster and more accurate panning and/or tilting, thereby allowing the camera to produce more images per time unit. Furthermore, it is an object of the present invention to provide an image rotating device, to be mounted externally to the digital camera, for providing efficient and rapid panning and/or tilting funtionality, without requiring large or expensive mechanics.

The above objects are achieved by providing the digital camera with an image rotating device having a mirror mounted externally to the camera housing and having a rotational member for rotating the mirror with respect to the optical input (lens or objective) of the camera housing in response to an angular displacement control signal received from a controller of the digital camera.

Other objects, features and advantages of the present invention will appear from the following detailed disclosure, from the appended claims as well as from the drawings.

BRIEF DESCRIPTION OF THE DRAWINGS

A preferred embodiment of the present invention will now be described in more detail, reference being made to the accompanying drawings, in which.

DETAILED DISCLOSURE

Figure 1:
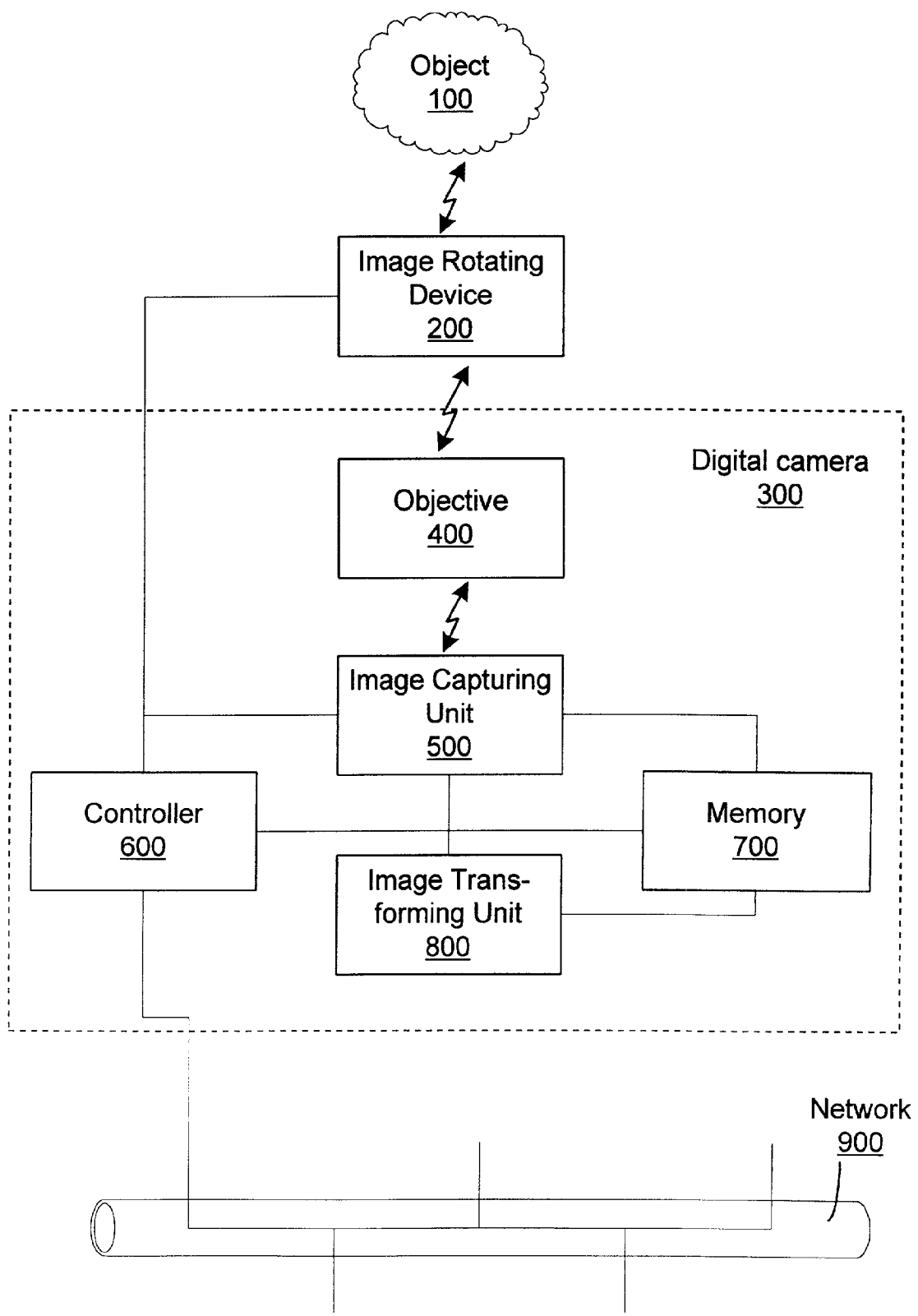
FIG. 1 is a schematic block diagram of the overall structure of a digital camera according to the preferred embodiment.

Referring to FIG. 1, a digital camera 300 is illustrated in a basic modular form. The digital camera 300 is arranged to produce one or several digital image(s) of a generic object 100, which may be any physical object that is present in a volume optically covered by the digital camera 300. An inventive image rotating device 200 is mounted externally to the digital camera 300 in front of an optical input 400 of the digital camera. The optical input 400 is a generally known lens or objective. The purpose of the image rotating device 200 is to extend the available field of view of the digital camera 300 in at least one plane, preferably in a horizontal plane as well as in a vertical plane. A preferred embodiment of the image rotating device 200 will be described in more detail with reference to FIGS. 2-4.

As shown in FIG. 1, the digital camera 300 further comprises an image capturing unit 500, which is provided with appropriate means for producing a digital image representative of the object 100. Preferably, the image capturing unit 500 comprises a CCD element (Charge Coupled Device), the internal structure of which is believed to be well-known to a man skilled in the art. The digital camera 300 also has a controller 600 for controlling the image capturing unit 500 as well as the external image rotating device 200. The controller 600 is operatively connected not only to the device 200 and the unit 500 but also to a digital memory 700 for storing images captured by the image capturing unit 500. Furthermore, the digital camera 300 may comprise an image transforming unit 800, the purpose of which is to rotate the digital image to compensate for image rotating effects caused by the image rotating device 200, when the field of view is panned or tilted. The image transforming unit 800 is responsive to an angle of rotation of the image rotating device 200 with respect to the objective 400 and uses this angle of rotation when transforming the digital image to compensate for the current pan and/or tilt angle. To perform such image transforming, i.e. to rotate a digital image in one or more than one direction, is believed to be well within reach of a man skilled in the art of digital cameras. Therefore, the internal structure of the image transforming unit 800 will not be described herein.

The memory 700 may be implemented by any commercially available memory, such as an EEPROM memory.

As indicated in FIG. 1, the digital camera 300 may be connected to a network 900, such as an Ethernet or Token Ring network, which in turn may be part of the Internet. In such an application, the controller 600 of the digital camera 300 is provided with appropriate software for allowing the digital camera 300 to act as a web camera available on the network 900, i.e. a web server that produces digital images.

The pan and/or tilt angle of the digital camera 300, or more specifically the angle(s) by which the image rotating device changes the field of view of the camera 300 with respect to a central axis of the objective 400, may be set and changed by a user of the camera by accessing the controller 600 through the network 900. Alternatively, the pan and/or tilt angle(s) may be controlled from a computer directly connected to the digital camera 300.

Figure 2:
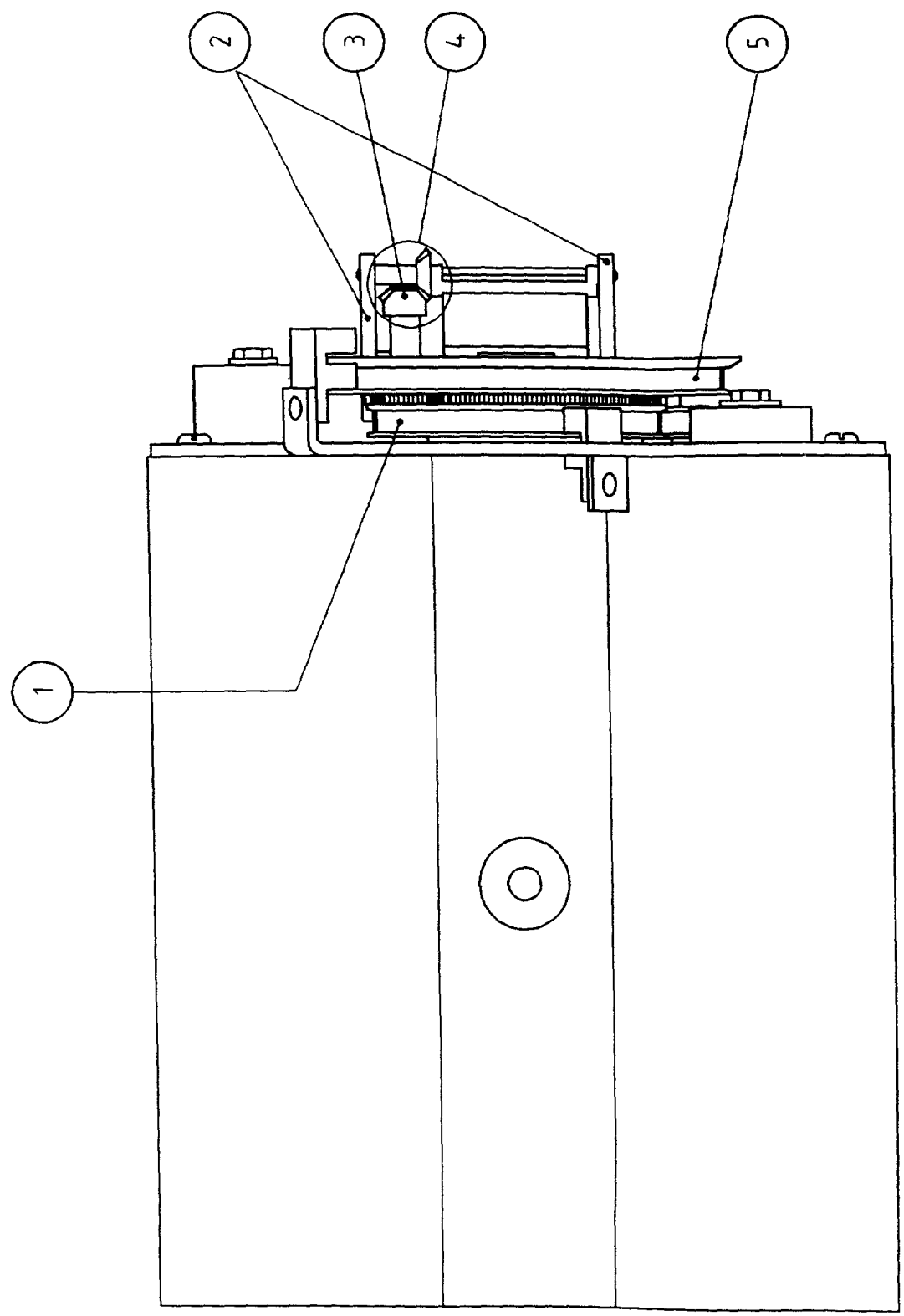
FIG. 2 is a first sideview of the image rotating device and the camera, to which it is mounted.
Figure 3:
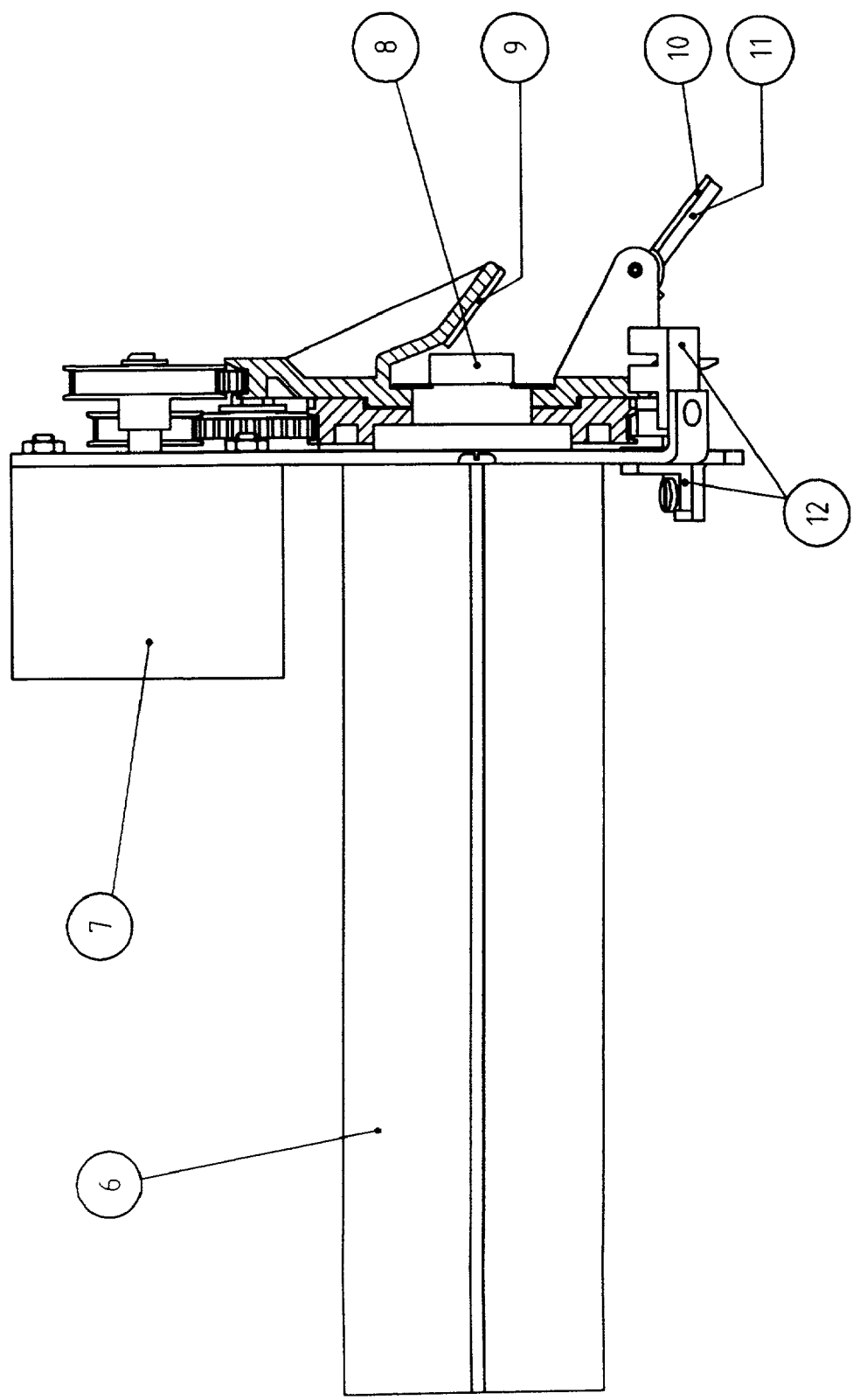
FIG. 3 is a second sideview of the image rotating device and the camera shown in FIG. 2.
Figure 4:
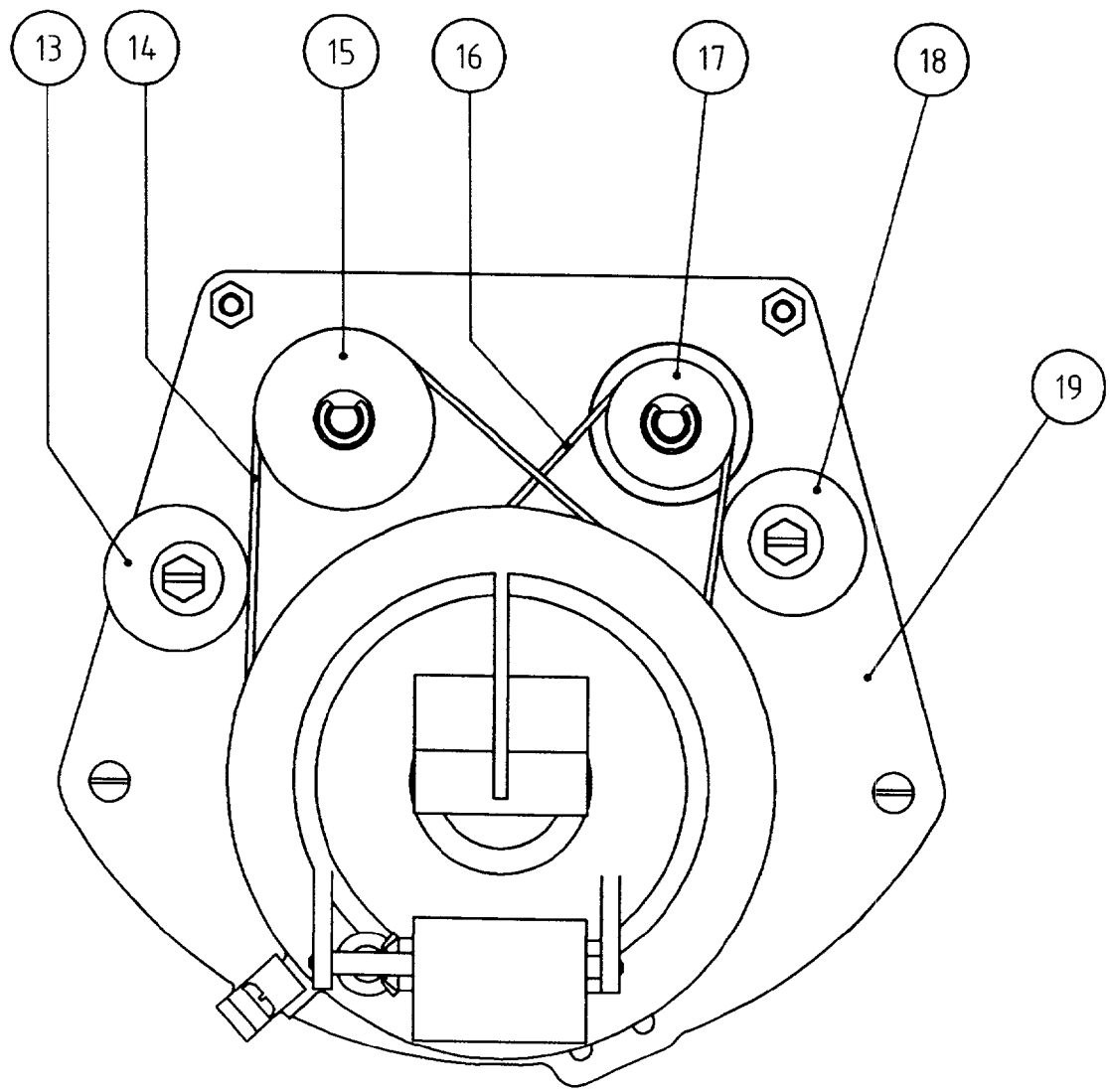
FIG. 4 is a topview of the image rotating device shown in FIGS. 2 and 3.

A preferred embodiment of the image rotating device 200 will now be described in more detail with reference to FIGS. 2-4. The following elements are shown in these drawings:

| Qty | Ref. No. | Name |
| --- | --- | --- |
| 1 | 19 | Frame |
| 1 | 18 | Timing belt tightener |
| 1 | 17 | Belt wheel |
| 1 | 16 | Timing belt |
| 1 | 15 | Belt wheel |
| 1 | 14 | Timing belt |
| 1 | 13 | Timing belt tightener |
| 2 | 12 | Optical sensor |
| 1 | 11 | Mirror holder |
| 1 | 10 | Tilting mirror |
| 1 | 9 | Fixed mirror |
| 1 | 8 | Camera lens (objective) |
| 2 | 7 | Motor |
| 1 | 6 | Camera housing |
| 1 | 5 | Mirror wheel |
| 1 | 4 | Bevel gear |
| 1 | 3 | Tilt shaft |
| 2 | 2 | Fixing part |
| 1 | 1 | Guiding wheel |

The image rotating device 200 has a mirror system, comprising a first fixed mirror 9 and a second tilting mirror 10. The fixed mirror 9 is mounted directly in front of the objective 8 at an angle of 37° relative to the optical center axis of the camera 300. The fixed mirror 9 is mounted to a mirror wheel 5, which is rotatable around the objective and hence provides a field of view with an angle of rotation of between 0° and 360°.

In the center of the field of view the tilting mirror 10 is mounted, so that the axis of rotation thereof is perpendicular to the optical center axis of the camera. The tilting mirror 10 is carried on the mirror wheel 5, thereby causing the tilting mirror 10 to rotate around the objective 8 together with the fixed mirror 9. Thanks to the geometrical arrangement of the mirrors 9 and 10 with respect to the objective 8, it is possible to monitor a large volume in a short time.

The tilting mirror 10 is attached to a mirror holder 11, which in turn is journalled in the mirror wheel 5 between two fixing parts 2. Opposite to the mirror wheel 5 a slightly smaller guiding wheel 1 is concentrically mounted. A tilt shaft 3 is eccentrically mounted to the mirror wheel, so as to cause the tilting mirror 10 to move. The guiding wheel 1 transmits its motion to the tilt shaft 3 and from the tilt shaft 3 through a bevel gear 4 to the mirror holder 11. The arrangement resembles a planetary gear, where the guiding wheel represents a sun pinion and the tilt shaft represents a planet pinion. The mirror wheel acts as holder of the planet pinion.

When the mirror wheel does not move, if the guiding wheel is rotated, the tilt shaft 3 will rotate around its own axis, wherein the mirror holder 11 will be rotated around its axis of rotation. Hence, the tilting mirror 10 is rotated with respect to the mirror wheel 5, and the center axis of the field of view will be angled with respect to the optical center of the camera. If the mirror wheel 5 and the guiding wheel 1 rotates at the same angular velocity, there will be no relative motion in the tilt shaft and consequently no rotation of the mirror holder/mirror around its axis of rotation. However, the mirror wheel 5 as a whole will rotate with the fixed mirror 9 and the tilting mirror 10 at a constant angle to the optical center axis of the camera.

In other words, by rotating the mirror wheel 5 and the guiding wheel 1 synchronously, the field of view may be rotated 360° for any given tilt angle. Then, if the wheels are rotated relative to each other, the angle of the mirror holder 11 will change, and the field of view may be again be rotated 360° for a new tilt angle. In this way, a very large volume around the camera may be covered, and images may be obtained for any given location within this large volume.

The mirror wheel 5 and the guiding wheel 1 are driven by respective motors 7. Belt wheels 15, 17, timing belts 14, 16 and timing belt tighteners 13, 18 are provided, as shown in FIGS. 2-4.

The inventive image rotating device provides at least the following advantages:
Low moment of inertia for rotating parts
High pan/tilt adjustment speed, short time between angular settings
High setting accuracy
Compact design
Few structural components
Low manufacturing cost
Flexible design
Simple pan/tilt control
Wide field of view The present invention has been described above with reference to a preferred embodiment. However, other embodiments than the one disclosed herein are possible within the scope of the invention, as defined by the appended independent patent claims.

The invention claimed is:

1. An apparatus for panning and tilting an optical input to an objective of a stationary camera; and the apparatus comprising:
    a panning mirror rotationally coupled to the camera for bending the optical input to align with an optical axis of the objective and the optical input and the optical axis defining a plane, and a rotation of the panning mirror panning the optical input to the objective of the camera about the optical axis;
    a tilting mirror radially displaced from the panning mirror about the optical axis, and rotationally coupled to the camera for rotation concentric with the panning mirror about the optical axis, and the tilting mirror optically coupled with the panning mirror and the titling mirror configured to tilt the optical input in selectable amounts about an axis substantially perpendicular to the plane; and
    a planetary linkage coupling the panning mirror and the titling mirror, and including:
        a mirror wheel rotatable about the optical axis, and the panning mirror affixed to the mirror wheel and the titling mirror tiltably affixed to the mirror wheel both for rotation about the optical axis;
        a guide wheel rotatable about the optical axis; and
        a planetary member mechanically coupled to both the guide wheel together with the mirror wheel to convert a relative rotation there between into a rotation of the planetary member and the planetary member further coupled to the tilt mirror to convert rotation of the planetary member into titling of the tilt mirror.

* * * * *

UNITED STATES PATENT AND TRADEMARK OFFICE
CERTIFICATE OF CORRECTION

PATENT NO. : 7,256,834 B1  Page 1 of 1
APPLICATION NO. : 09/700530
DATED : August 14, 2007
INVENTOR(S) : Sagefalk et al.

It is certified that error appears in the above-identified patent and that said Letters Patent is hereby corrected as shown below:

IN THE SPECIFICATION

At column 4, lines 49, 54, 57 and 65 delete "titling" and insert therefor --tilting--.

Signed and Sealed this

Twenty-fifth Day of November, 2008

JON W. DUDAS
*Director of the United States Patent and Trademark Office*